United States Patent
Honjo (10) Patent No.: US 11,205,258 B2
(45) Date of Patent: Dec. 21, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tomoya Honjo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 16/739,923

(22) Filed: Jan. 10, 2020

(65) Prior Publication Data
US 2020/0226739 A1 Jul. 16, 2020

(30) Foreign Application Priority Data
Jan. 16, 2019 (JP) .............................. JP2019-004964

(51) Int. Cl.
*G06K 9/00* (2006.01)
*G06T 7/00* (2017.01)
*G06F 17/18* (2006.01)

(52) U.S. Cl.
CPC ............ *G06T 7/0002* (2013.01); *G06F 17/18* (2013.01); *G06T 7/97* (2017.01); *G06K 9/00268* (2013.01); *G06K 9/00288* (2013.01)

(58) Field of Classification Search
CPC ......... G06T 7/0002; G06T 7/97; G06F 17/18; G06K 9/00288; G06K 9/00268; G06K 9/00771; G06K 9/00295; G06K 9/00; G06K 9/00281; G06K 9/6211
USPC ........................................................ 382/181
See application file for complete search history.

(56) References Cited

U.S. PATENT DOCUMENTS

| | | | | |
|---|---|---|---|---|
| 8,369,586 B2* | 2/2013 | Corcoran | ............. | A61B 5/1176 382/118 |
| 8,451,475 B2* | 5/2013 | Couchman | ......... | H04N 1/00326 358/1.15 |
| 8,488,023 B2* | 7/2013 | Bacivarov | ................. | G06T 7/40 348/239 |
| 8,553,037 B2* | 10/2013 | Smith | ..................... | G06T 13/40 345/473 |
| 8,649,604 B2* | 2/2014 | Steinberg | ........... | G06K 9/00288 382/190 |

(Continued)

FOREIGN PATENT DOCUMENTS

JP 2011060155 A * 3/2011
JP 2015019250 A   1/2015

*Primary Examiner* — Mahendra R Patel
(74) *Attorney, Agent, or Firm* — Canon U.S.A., Inc. IP Division (57) ABSTRACT

An image processing apparatus includes an identification unit configured to execute identification processing for associating an object included in a first captured image captured by a first image-capturing apparatus with an object included in a second captured image captured by a second image-capturing apparatus different from the first image-capturing apparatus, a recording unit configured to record a result of the identification processing executed by the identification unit, and a determination unit configured to determine a state of a restriction condition based on the result of the identification processing recorded by the recording unit and the restriction condition relating to the identification processing set between the first image-capturing apparatus and the second image-capturing apparatus.

19 Claims, 7 Drawing Sheets

(56) References Cited

U.S. PATENT DOCUMENTS

| | | | | |
|---|---|---|---|---|
| 9,483,683 | B2* | 11/2016 | Aoki | G06T 5/006 |
| 9,508,151 | B2* | 11/2016 | Romanik | G06K 9/00 |
| 10,825,194 | B2* | 11/2020 | Paik | G06T 7/41 |
| 2009/0087101 | A1* | 4/2009 | Matsushita | H04N 1/00347 382/190 |
| 2009/0316990 | A1* | 12/2009 | Nakamura | G06K 9/6211 382/173 |
| 2012/0281874 | A1* | 11/2012 | Lure | G06K 9/00248 382/103 |
| 2013/0141570 | A1* | 6/2013 | Saruta | G06K 9/6255 348/135 |
| 2014/0169625 | A1* | 6/2014 | Murase | G06K 9/00389 382/103 |
| 2015/0146991 | A1* | 5/2015 | Nakano | G06K 9/00288 382/219 |
| 2016/0012599 | A1* | 1/2016 | Kuboyama | G06F 3/017 348/348 |
| 2016/0253554 | A1* | 9/2016 | Tsuji | G06K 9/3208 382/115 |
| 2016/0364883 | A1* | 12/2016 | Shiiyama | G06K 9/4642 |
| 2017/0109572 | A1* | 4/2017 | Tojo | H04N 5/247 |
| 2018/0096209 | A1* | 4/2018 | Matsuda | G06K 9/46 |
| 2018/0239782 | A1* | 8/2018 | Saito | G06F 16/583 |
| 2019/0102643 | A1* | 4/2019 | Furukawa | G06T 7/194 |
| 2019/0102873 | A1* | 4/2019 | Wang | G06K 9/54 |
| 2019/0139212 | A1* | 5/2019 | Hanzawa | G06T 7/0004 |
| 2019/0197356 | A1* | 6/2019 | Kurita | G06K 9/6254 |
| 2020/0143196 | A1* | 5/2020 | Iwamoto | G06K 9/00 |

* cited by examiner

| CAMERA ID | x | y | w | h | FEATURE AMOUNT | CAPTURED TIME | TRACKING ID |
|---|---|---|---|---|---|---|---|
| 1011 | 100 | 150 | 25 | 75 | $f_{1011133108}$ | 13:31:08 | 1 |
| 1011 | 110 | 145 | 25 | 75 | $f_{1011133109}$ | 13:31:09 | 1 |
| 1011 | 120 | 140 | 25 | 75 | $f_{1011133110}$ | 13:31:10 | 1 |
| ... | ... | ... | ... | ... | ... | ... | ... |
| 1012 | 950 | 50 | 40 | 80 | $f_{1012133108}$ | 13:31:08 | 2 |
| ... | ... | ... | ... | ... | ... | ... | ... |
| 1013 | 640 | 510 | 25 | 75 | $f_{1013134132}$ | 13:41:32 | 1 |
| ... | ... | ... | ... | ... | ... | ... | ... |

| CAMERAS | RESTRICTION CONDITION | IDENTIFICATION RESULT | STATE |
|---|---|---|---|
| 1011-1012 | 15 min | 15 min | NORMAL |
| 1011-1013 | 10 min | 10 min | NORMAL |
| ... | ... | ... | ... |
| 1012-1013 | 20 min | 20 min | MODIFICATION RECOMMENDED |
| ... | ... | ... | ... |

IMAGE PROCESSING APPARATUS, IMAGE PROCESSING METHOD, AND STORAGE MEDIUM

BACKGROUND OF THE INVENTION

Field of the Invention

The present disclosure relates to an image processing apparatus, an image processing method, and a storage medium.

Description of the Related Art

Some typical object identification techniques are known to analyze images (video images) captured by each of a plurality of image-capturing apparatuses which is installed in, for example, an airport or a shopping mall, thus identifying and tracking a person among the image-capturing apparatuses. Such a technique is referred to as the Re-Identification (Re-ID) technique.

Japanese Patent Application Laid-Open No. 2015-019250 discusses a technique for enabling a user to easily perform operation for modifying a tracking result if there is an error in a tracking result of a tracking target object when the object is identified and tracked between the image-capturing apparatuses. In this technique, captured images including objects highly relevant with the object specified as a tracking target are displayed as candidate images on a display screen, and a tracking result is modified by prompting an observer to select a candidate image including the object specified as a tracking target.

The technique discussed in Japanese Patent Application Laid-Open No. 2015-019250 is, however, only intended to modify the tracking result after the object is identified. Thus, even if that tracking result can be modified, object identification may fail again if another object is specified as a tracking target, and thus there is a possibility of outputting an erroneous tracking result.

In the object identification processing, a restriction condition set between image-capturing apparatuses may be used in addition to image features of an object. The restriction condition between the image-capturing apparatuses includes a spatiotemporal restriction, such as a probability of the object traveling from one image-capturing apparatus to another image-capturing apparatus or the time for the object to travel from one image-capturing apparatus to another image-capturing apparatus. An inappropriate restriction condition set between the image-capturing apparatuses is considered as a cause of failure in the identification processing.

In order to track the object with higher accuracy, it is desirable that image-capturing apparatuses between which an inappropriate condition is set be identified and the inappropriate restriction condition be appropriately modified. The user, however, cannot easily identify the image-capturing apparatuses for which the restriction condition is required, and modifying the restriction condition takes time and effort.

Thus, there is a need in the art to facilitate modification of the restriction condition which is set between the image-capturing apparatuses and relates to the processing of identifying an object between image-capturing apparatuses.

SUMMARY OF THE INVENTION

According to an aspect of the present disclosure, an image processing apparatus includes an identification unit configured to execute identification processing for associating an object included in a first captured image captured by a first image-capturing apparatus with an object included in a second captured image captured by a second image-capturing apparatus different from the first image-capturing apparatus, a recording unit configured to record a result of the identification processing executed by the identification unit, and a determination unit configured to determine a state of a restriction condition based on the result of the identification processing recorded by the recording unit and the restriction condition relating to the identification processing set between the first image-capturing apparatus and the second image-capturing apparatus.

Further features of the present disclosure will become apparent from the following description of exemplary embodiments with reference to the attached drawings.

DESCRIPTION OF THE EMBODIMENTS

Hereinafter, with reference to the accompanying drawings, an exemplary embodiment for embodying the present disclosure will be described in detail.

The exemplary embodiments described below are merely examples for realizing the present disclosure, and should be modified or changed as appropriate according to a configuration or various conditions of the apparatus to which the present disclosure is applied, and thus the present disclosure is not limited to the below-described exemplary embodiments.

In the present exemplary embodiment, a description will be provided of an image processing system which analyzes captured images captured by a plurality of image-capturing apparatuses and identifies and tracks an object moving between the image-capturing apparatuses. While an object moving between different image-capturing apparatuses is generally treated as different objects, the object can be determined as an identical object using a feature amount of an object image and can be tracked.

The image processing system in the present exemplary embodiment executes identification processing of identifying the object using a feature amount of an object image and a restriction condition set between the image-capturing apparatuses. In the present exemplary embodiment, a case will be described where a travel time of the object, i.e., the time taken for the object to travel from one image-capturing apparatus to another image-capturing apparatus, is used as the restriction condition set between the image-capturing apparatuses.

Figure 1:
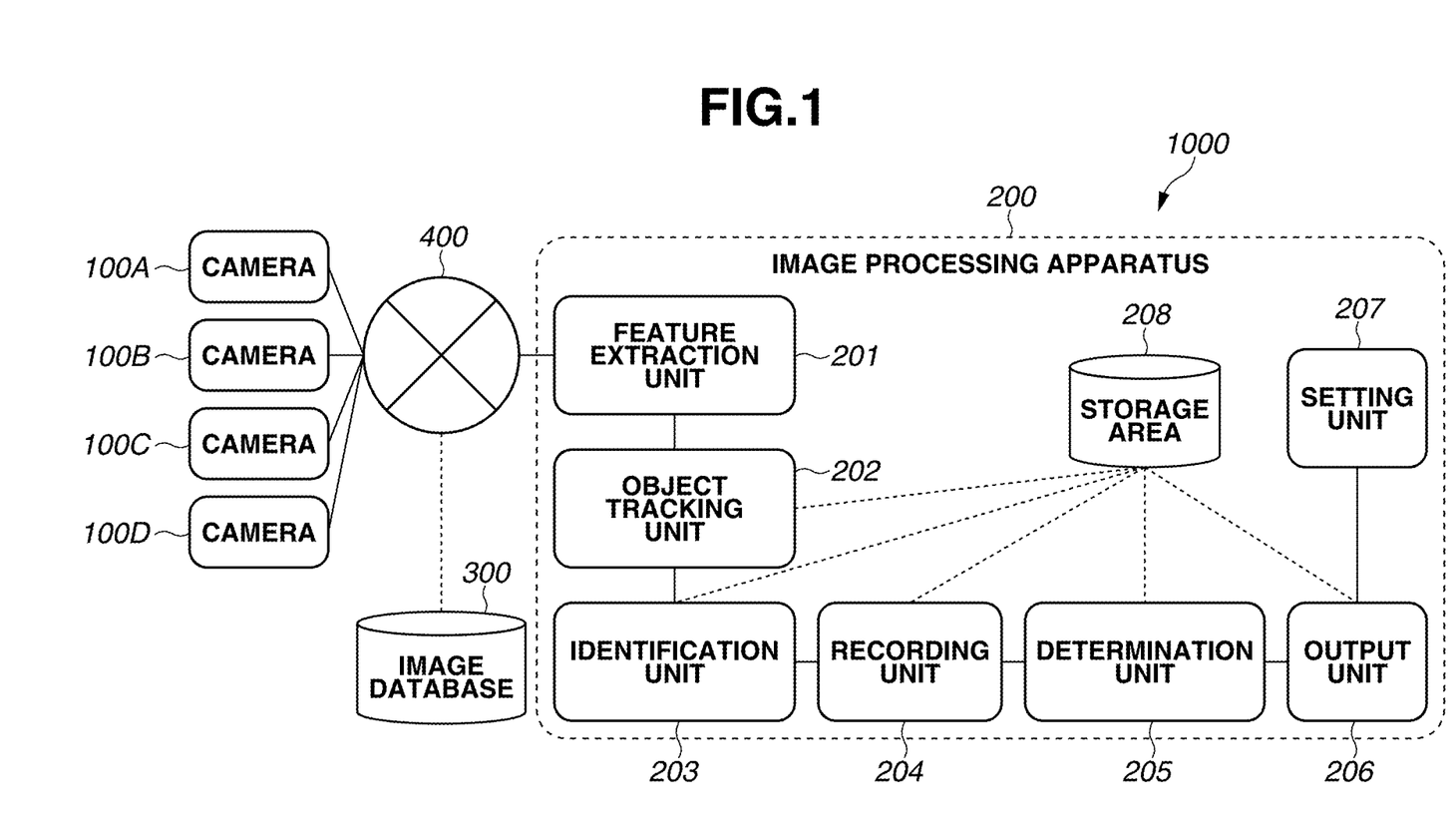
FIG. 1 is a block diagram illustrating an example of a system configuration of an image processing system according to an exemplary embodiment.

FIG. 1 is a block diagram illustrating an example of a system configuration of an image processing system 1000 according to the present exemplary embodiment. The image processing system 1000 according to the present exemplary embodiment includes a plurality of image-capturing apparatuses 100A to 100D (in FIG. 1, four image-capturing apparatuses), an image processing apparatus 200, and an image database 300. The image-capturing apparatuses 100A to 100D, the image processing apparatus 200, and the image database 300 are communicably connected to each other via a network 400.

A communication standard, a scale, and a configuration of the network 400 are not limited as long as the image-capturing apparatuses 100A to 100D, the image processing apparatus 200, and the image database 300 can communicate with each other. The network 400 may be implemented by the internet, a wired local area network (LAN), a wireless LAN, a wide area network (WAN), or a combination of these networks.

Each of the image-capturing apparatuses 100A to 100D is a network camera (hereinafter, simply referred to as "camera"), and a camera identification (ID) for uniquely identifying each camera is provided thereto. Each of the cameras 100A to 100D is installed in a different place and captures still images or moving images in set or controlled orientations. The cameras 100A to 100D may each capture a different image-capturing area, and do not necessarily have to have an image-capturing area in common. In addition, an installation layout of the cameras 100A to 100D is not limited in particular. Some of the cameras 100A to 100D may be collectively installed in a same area. For example, of the cameras 100A to 100D, some are installed in a room A, and the others are installed in another room B.

The cameras 100A to 100D may support the Power over Ethernet (PoE) (registered trademark), or may receive power via a LAN cable. While the four cameras 100A to 100D are connected to the network 400 in FIG. 1, the number of cameras connected to the network 400 is not limited to the number illustrated in FIG. 1 as long as two or more cameras are connected to the network 400.

The captured images captured by the respective cameras 100A to 100D are saved in the image database 300 via the network 400. At this time, each of the captured images is saved together with a captured time and a camera ID. If each of the cameras 100A to 100D outputs a still image, the captured images saved in the image database 300 are the still images themselves. On the other hand, if each of the cameras 100A to 100D outputs a moving image, individual frames that constitute the moving images is saved as the captured images.

A display apparatus that includes a general-purpose computer and a monitor capable of displaying an image can be used as the image processing apparatus 200. For example, the image processing apparatus 200 can be configured of a personal computer (PC) or a mobile terminal.

The image processing apparatus 200 can extract a feature amount of the object from the captured images saved in the image database 300, and execute object identification among the captured images captured by cameras based on the extracted feature amount and a restriction condition set between the cameras. The image processing apparatus 200 records a result of the identification processing of the object (identification result) and determines a state of the restriction condition set between the cameras (hereinafter, also referred to as "a state between the cameras") based on the recorded identification result and the restriction condition set between the cameras. Further, the image processing apparatus 200 can provide information to the user based on the determined state between the cameras.

In the present exemplary embodiment, a description will be provided of a case where the object specified as an identification target is a person. However, the object to be identified is not limited to a person, as long as the object to be identified is a moving body moving between the cameras, a feature amount of which can be extracted from the captured images.

The image processing apparatus 200 includes a feature extraction unit 201, an object tracking unit 202, an identification unit 203, a recording unit 204, a determination unit 205, an output unit 206, a setting unit 207, and a storage area 208.

The feature extraction unit 201 acquires captured images from the cameras 100A to 100D via the network 400, detects an object from the captured images, and extracts feature amounts of the detected object.

The object tracking unit 202 executes tracking processing for tracking an object in images captured by the same camera.

The identification unit 203 executes identification processing for associating an identical object in the captured images captured by the plurality of cameras (hereinafter, also referred to as "identification processing between cameras").

The recording unit 204 records a result of the identification processing between the cameras acquired by the identification unit 203 in the storage area 208.

The determination unit 205 determines the state between the cameras based on the result of the identification processing between the cameras recorded in the storage area 208 and the restriction condition set between the cameras.

The output unit 206 outputs the information to be provided to the user based on the state between the cameras determined by the determination unit 205. In the present exemplary embodiment, the output unit 206 outputs the information to a display unit 216 (see FIG. 2) included in the image processing apparatus 200 and executes display control for displaying the information on a screen. Alternatively, the output unit 206 may output the information to another apparatus and cause this apparatus to provide the information to the user.

The setting unit 207 acquires information set by the user. The information acquired by the setting unit 207 includes information about the identification target object specified by the user.

The storage area 208 can store tracking information indicating a tracking result acquired by the object tracking unit 202. The storage area 208 can also store an identification result acquired by the identification unit 203, the restriction condition between the cameras, and the state between the cameras.

Figure 2:
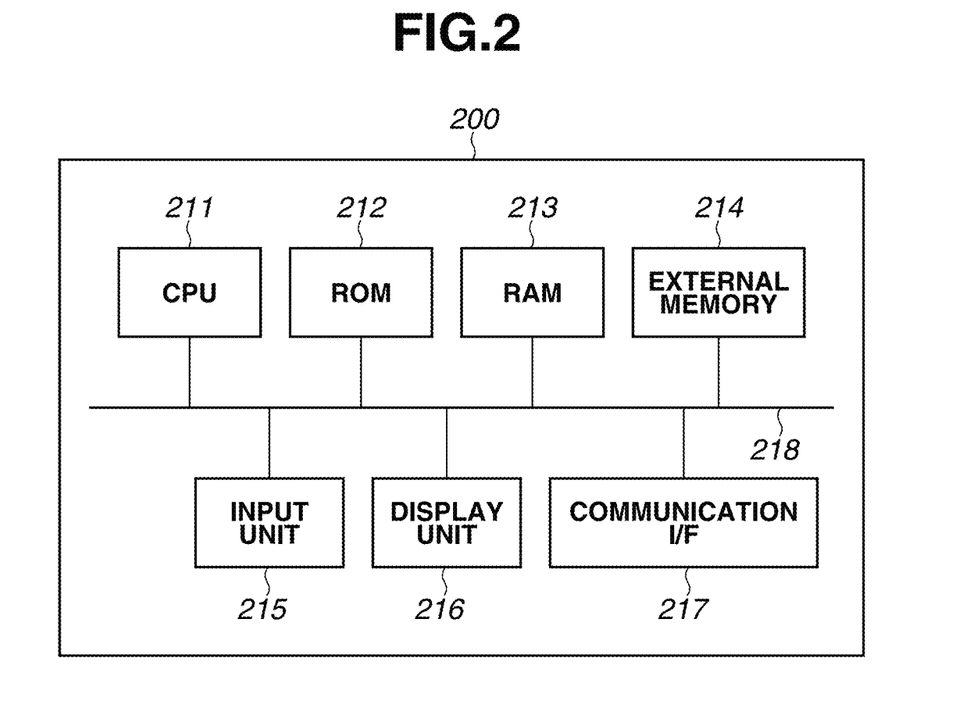
FIG. 2 is a block diagram illustrating a hardware configuration of an image processing apparatus.

FIG. 2 is a block diagram illustrating an example of a hardware configuration of the image processing apparatus 200.

The image processing apparatus 200 includes a central processing unit (CPU) 211, a read only memory (ROM) 212, a random access memory (RAM) 213, an external memory 214, an input unit 215, a display unit 216, and a communication interface (I/F) 217. The CPU 211, the ROM 212, the RAM 213, the external memory 214, the input unit 215, the display unit 216, and the communication I/F 217 are connected to an internal bus 218.

The CPU 211 perform centralized control of the operation performed by the image processing apparatus 200. The ROM 212 is a non-volatile memory that stores a program and data necessary for the CPU 211 to execute processing. The RAM 213 functions as a main memory and a work area of the CPU 211. The CPU 211 loads a program necessary for executing processing on the RAM 213 from the ROM 212, and realizes various functional operations by executing the program.

The external memory 214 is a non-volatile storage apparatus represented by a hard disk drive (HDD), a flash memory, or a secure digital (SD) card, and the external memory 214 may be demountable. The external memory 214 can be used not only as a permanent storage area for an operating system (OS), various programs, and various data, but also as a short-term storage area for various data.

The input unit 215 is an input-output (I/O) device including a keyboard and a pointing device, such as a mouse, which can be operated by the user. The display unit 216 includes a monitor such as a liquid crystal display (LCD), and can provide information to the user. The communication I/F 217 transmits to and receives data from the cameras 100A to 100D and the image database 300 via the network 400.

Functions of at least a part of the constituent elements of the image processing apparatus 200 illustrated in FIG. 1 can be realized by the CPU 211 executing the program. However, at least a part of the constituent elements of the image processing apparatus 200 in FIG. 1 may operate as dedicated hardware. In such a case, the dedicated hardware operates based on control executed by the CPU 211.

Hereinafter, the operation of the image processing apparatus 200 will be described.

Figure 3A:
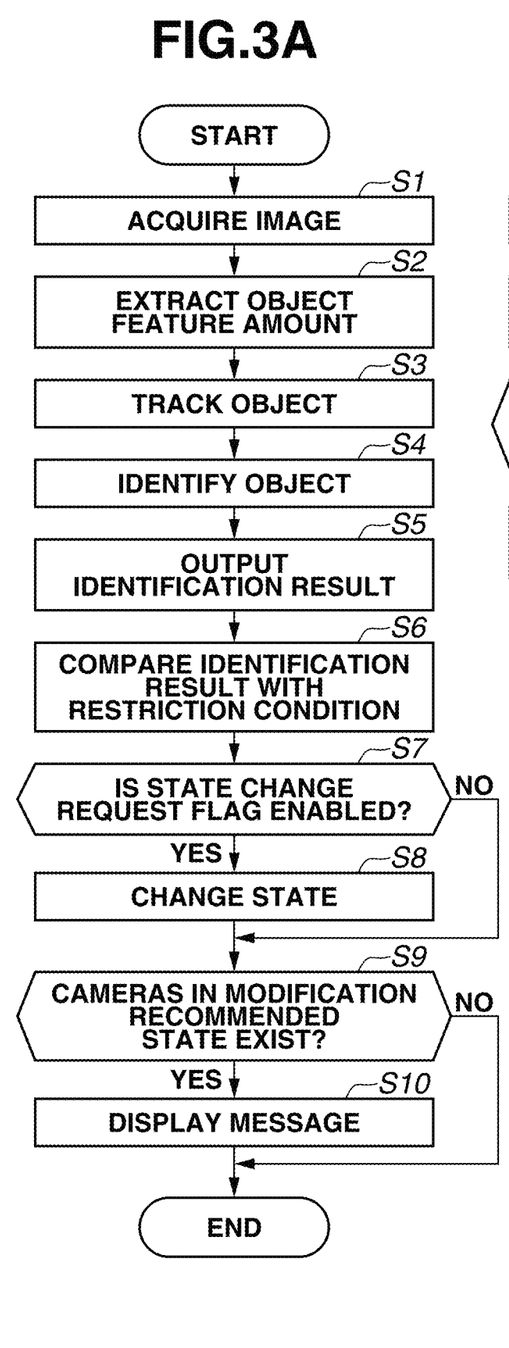
FIGS. 3A and 3B are flowcharts each illustrating processing which is executed by the image processing apparatus.

FIG. 3A is a flowchart illustrating processing for determining the state between the cameras, which is executed by the image processing apparatus 200. The processing in FIG. 3A can be started at a timing when the cameras 100A to 100D start capturing images. The timing for starting the processing in FIG. 3A is not limited to the above-described timing. The image processing apparatus 200 can realize the processing illustrated in FIG. 3A by the CPU 211 reading a necessary program and executing the read program.

In step S1, the image processing apparatus 200 initially acquires a captured image saved in the image database 300 together with the captured time and the ID of the camera at a certain frame interval.

In step S2, the image processing apparatus 200 executes detection processing for detecting the object from the captured image acquired in step S1. After executing the detection processing of the object, the image processing apparatus 200 extracts a feature amount of the object from an object image.

In the detection processing of the object, the image processing apparatus 200 initially detects a moving object area that includes a moving object, from the captured image. As a method for detecting a moving object area, a background differencing method can be used. In the background differencing method, a background model is previously generated from an image including a background, and a moving object area is detected based on a difference between the background model and the input image. Then, with respect to the detected moving object area, the image processing apparatus 200 scans the input image with a detection window having a predetermined size, and executes 2-class discrimination to discriminate whether a pattern image that is an image clipped from the detection window is a person. In this way, a person specified as an object can be detected. In addition, a detection method of the object is not limited to the above, and an optional method can be used.

In the present exemplary embodiment, the image processing apparatus 200 extracts facial features of the object as features of the object. The Histograms of Oriented Gradients (HOG) feature amount which expresses a position of a facial landmark (e.g., eye, nose, or mouth) and gradient information about colors in its surrounding can be used as the feature amount. In order to prevent the feature amount from being dependent on a size in the image, the image processing apparatus 200 may execute normalization processing so that a value of the feature amount falls within a range of 0 to 1. In addition, the features of the object is not limited to the facial features, and any features can be used as long as the object can be identified therewith.

Figure 4A:
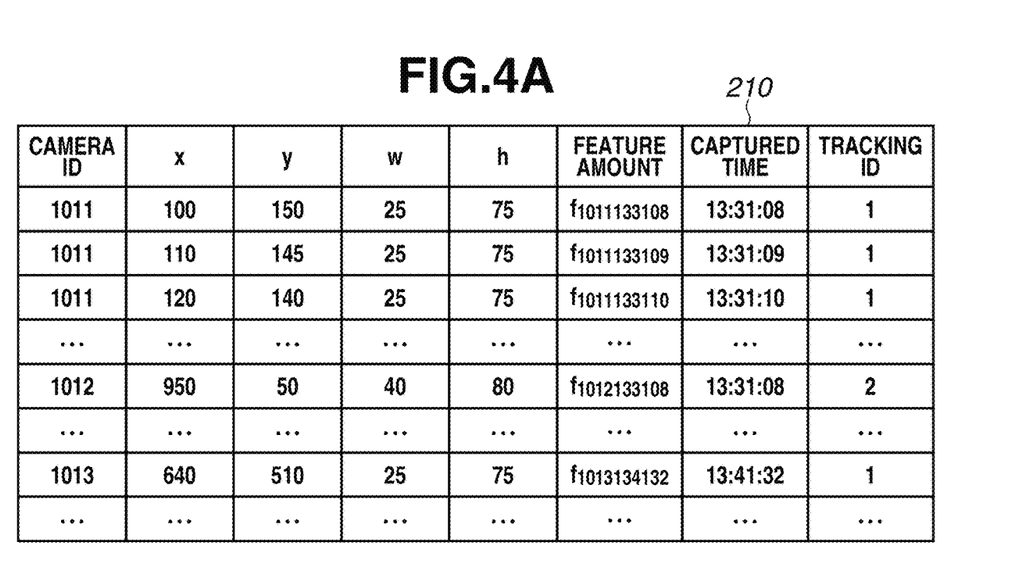
FIG. 4A is a table illustrating an example of tracking information.

In step S3, the image processing apparatus 200 executes tracking processing for tracking the object in the same camera based on a plurality of captured images captured by the same camera. At this time, the image processing apparatus 200 assigns a tracking ID to an object area in a tracked state. The image processing apparatus 200 stores the camera ID, a central position (x, y) of the object area, a size (a width (w) and a height (h)) of a rectangular area including the object area, a feature amount (f) of the object, and a captured time in the storage area 208 together with the tracking ID as the tracking information. An example of the tracking information stored in the storage area 208 is illustrated in FIG. 4A.

Here, the central position of the object area is defined as the central position of the rectangular area enclosing the object area. In the tracking processing of the object according to the present exemplary embodiment, the image processing apparatus 200 associates objects with each other based on the central position of the object area included in a previous frame and the central position of the object area included in a current frame. The image processing apparatus 200 applies the tracking ID indicating that the objects are identical to each other, as a result of the tracking processing of the object.

In step S4, the image processing apparatus 200 executes identification processing for identifying the objects between the plurality of cameras based on the captured images captured by respective cameras. Specifically, the image processing apparatus 200 executes processing for associating an object included in a captured image captured by a predetermined camera with an object included in a captured image captured by a camera different from the predetermined camera.

The image processing apparatus 200 executes the identification processing for identifying the object between the cameras based on the feature amount of the object extracted in step S2, the captured time, the feature amount and the captured time of the object stored in the storage area 208 in step S3, and the restriction condition set between the cameras. In the present exemplary embodiment, the identification processing will be described with respect to the case where a camera-to-camera travel time is used as the restriction condition between the cameras.

Specifically, the image processing apparatus 200 initially acquires the tracking ID of the object for which the user has specified as the identification target via the setting unit 207. For example, the image processing apparatus 200 displays a captured image captured by at least any one of the cameras 100A to 100D on the display unit 216, sets an object that is specified by the user in the captured image, as the identification target object, and acquires a tracking ID of that object. The identification target object does not always have to be specified by the user, and a person having facial features matching pre-registered facial features may be specified as the identification target, or the identification target may be set based on other attributes.

Next, the image processing apparatus 200 reads the feature amount associated with the acquired tracking ID from the storage area 208, and calculates an object-to-object distance which represents a difference between the read feature amount and the feature amount of the object extracted from the captured image captured by another camera. For example, the Euclidean distance in a feature space can be used as the object-to-object distance.

Figure 4B:
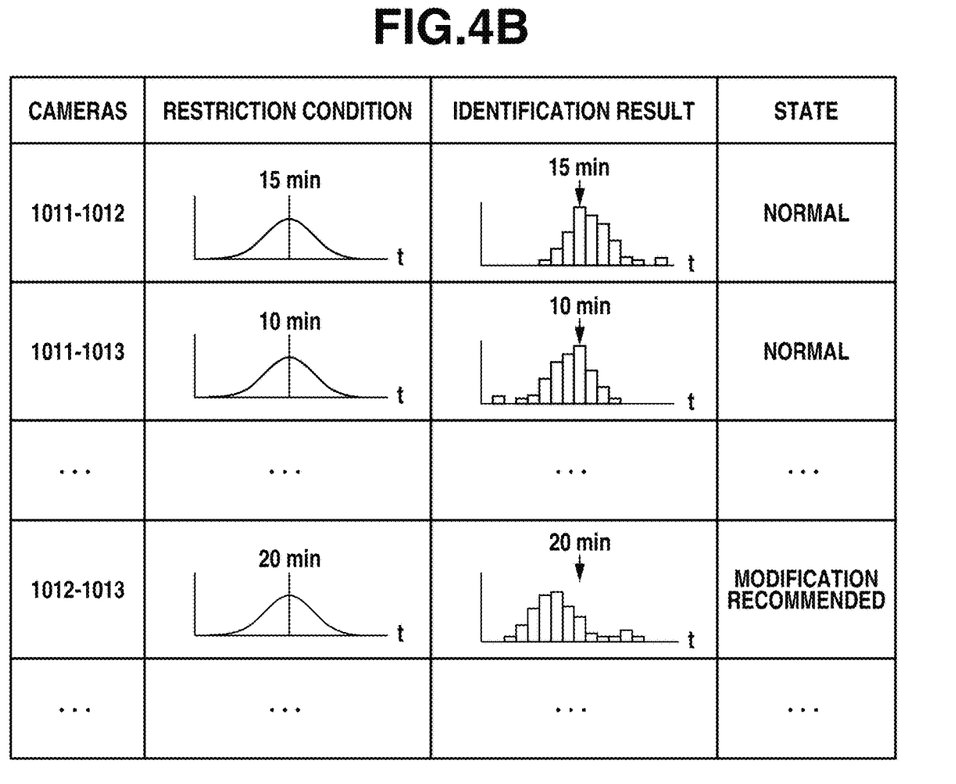
FIG. 4B is a table illustrating an example of information about a state between cameras.

Next, the image processing apparatus 200 uses the restriction condition set between the cameras to modify the calculated object-to-object distance based on the feature amount of the object. As illustrated in FIG. 4B, the restriction condition between the cameras is set in a normal distribution with a time t as the horizontal axis. In such a case, the image processing apparatus 200 modifies the object-to-object distance by using an average time t1 in the normal distribution and a captured time difference t2 which is a difference in the captured time of the identification target object between two cameras (i.e., actual camera-to-camera travel time of the object).

When the object-to-object distance calculated based on the feature amount of the object is expressed as "l", and the modified object-to-object distance is expressed as "l'", the modified object-to-object distance l' can be expressed by the following formula:

$$l' = l \times |t2 - t1| \qquad \text{Formula 1}$$

Formula 1 expresses that the object-to-object distance l' becomes shorter as a difference between the average time t1 in the normal distribution and the captured time difference t2 for the identification target object is smaller.

Lastly, the image processing apparatus 200 compares the object-to-object distance l' with a predetermined threshold value, and determines that the objects are identical if the object-to-object l' is the threshold value or less. As the tracking information for the object area determined as the identical object, the image processing apparatus 200 stores the camera ID, the feature amount of the object area, the central position of the object area, the size of the rectangular area enclosing the object area, and a captured time in the storage area 208 in association with the same tracking ID.

The image processing apparatus 200 thus sets an object as the identification target from a captured image captured by one of the cameras in the identification processing between the cameras. Further, the image processing apparatus 200 extracts a feature amount of an object from a captured image captured by each of the cameras. The image processing apparatus 200 then determines an object identical to the object specified as the identification target from the captured image captured by another camera based on the extracted feature amount and the restriction condition set between the cameras.

In step S5, the image processing apparatus 200 records the identification result between the cameras in the storage area 208. Here, the identification result between the cameras is the camera-to-camera travel time of the identified object. In other words, the identification result between the cameras recorded in the storage area 208 in step S5 is the captured time difference t2 for the identification target object calculated in step S4.

FIG. 4B is a table illustrating an example of the identification result recorded in the storage area 208. In FIG. 4B, a travel time of the object is recorded as a histogram between the cameras. For example, a vote is casted for a bin of the corresponding travel time every time the identification is executed, with the bin width in the histogram being one minute. In such a way, the image processing apparatus 200 records a result of the identification processing between the cameras in the storage area 208 as a history.

In step S6, the image processing apparatus 200 compares the identification result between the cameras recorded in the storage area 208 with the restriction condition set between the cameras, and determines whether to change the state between the cameras. The image processing apparatus 200 calculates an absolute value of a difference between the distribution of the restriction condition and the normalized identification result (travel time) for each bin in the histogram of the identification result, and acquires an integrated value v1 of absolute values.

$$v1 = \Sigma_t (|g(t) - b(t)|) \qquad \text{Formula 2}$$

In Formula 2, "g(t)" is a distribution of the restriction condition, and "b(t)" is a value of the bin at the time t of the histogram of the identification result. The integrated value v1 acquired by using Formula 2 represents a degree of divergence between the identification result and the restriction condition.

The image processing apparatus 200 then sets a state change request flag indicating whether the state between the cameras has to be changed based on the acquired integrated value v1 and the current state between the cameras.

In the present exemplary embodiment two states, namely, "normal state" and "modification recommended state", are defined as the state between the cameras. The normal state indicates a state where the restriction condition between the cameras is set appropriately, and does not have to be modified. The modification recommended state indicates a state where the restriction condition between the cameras has to be modified.

The image processing apparatus 200 enables the state change request flag in a case where the acquired integrated value v1 is a predetermined threshold value or more when the current state between the cameras is "normal state", or in a case where the acquired integrated value v1 is less than the predetermined threshold value when the current state between the cameras is "modification recommended state". In other words, if there is a divergence between the identification result and the restriction condition when the current state between the cameras is the normal state, the image processing apparatus 200 determines that the state between the cameras has to be changed from the normal state to the modification recommended state, and enables the state change request flag. If there is no divergence between the identification result and the restriction condition when the current state between the cameras is the modification recommended state, the image processing apparatus 200 determines that the state between the cameras has to be changed from the modification recommended state to the normal state, and enables the state change request flag.

On the other hand, the image processing apparatus 200 does not enable the state change request flag in a case where the acquired integrated value v1 is less than the predetermined threshold value when the current state between the cameras is the normal state, or in a case where the acquired integrated value v1 is the predetermined threshold value or more when the current state between the cameras is "modification recommended state". In other words, the image processing apparatus 200 determines that the state between the cameras does not have to be changed.

In step S7, the image processing apparatus 200 determines whether the state change request flag is enabled in step S6. If the state change request flag is enabled (YES in step S7), the processing proceeds to step S8. If the state change request flag is not enabled (NO in step S7), the processing proceeds to step S9.

In step S8, the image processing apparatus 200 changes the state between the cameras to which the enabled state change request flag is set. More specifically, the image processing apparatus 200 changes the state between the cameras to which the enabled state change request flag is set to the modification recommended state if the current state is the normal state, and changes the state between the cameras to the normal state if the current state is the modification recommended state.

In step S9, the image processing apparatus 200 determines whether there are cameras that are in the modification recommended state as the state between the cameras. Then, if it is determined that there are cameras that are in the modification recommended state (YES in step S9), the processing proceeds to step S10. If there is no cameras that are in the modification recommended state (NO in step S9), the image processing apparatus 200 ends the processing in FIG. 3A.

In step S10, the image processing apparatus 200 executes display control for displaying a message prompting the user to modify the restriction condition between the cameras in the modification recommended state on the display unit 216. For example, a pop-up message "modification of restriction condition is recommended" may be displayed on a screen. At this time, a button for shifting the screen to a modification screen for the restriction condition may be displayed. Further, a text box may be arranged on the pop-up display portion to enable the user to directly modify the restriction condition between the cameras in the modification recommended state.

Figure 3B:
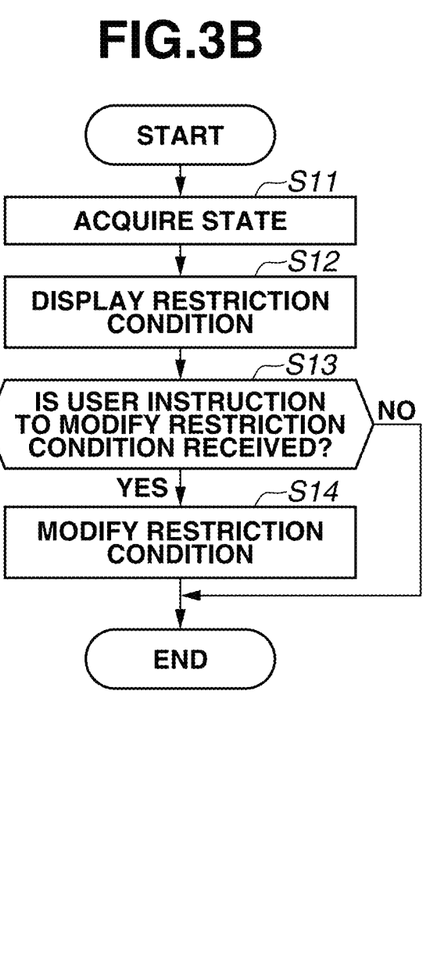

FIG. 3B is a flowchart illustrating restriction condition modification processing which is executed by the image processing apparatus 200.

The processing in FIG. 3B can be started at a timing when the user inputs an instruction to activate the modification screen of the restriction condition. For example, the processing in FIG. 3B can be started at a timing when the image processing apparatus 200 detects that the user has pressed a button for shifting a screen to the modification screen for the restriction condition displayed in step S10 in FIG. 3A. The image processing apparatus 200 can realize the processing illustrated in FIG. 3B by the CPU 211 reading a necessary program and executing the read program.

First, in step S11, the image processing apparatus 200 acquires the state between the cameras and the identification result between the cameras recorded in the storage area 208.

Next, in step S12, the image processing apparatus 200 acquires the restriction condition between the cameras from the storage area 208, acquires a map illustrating a real space and information about the installation of the cameras in the real space, and executes display control for displaying the information on a screen. An example of a display screen of the restriction condition is illustrated in FIG. 5.

Figure 5:
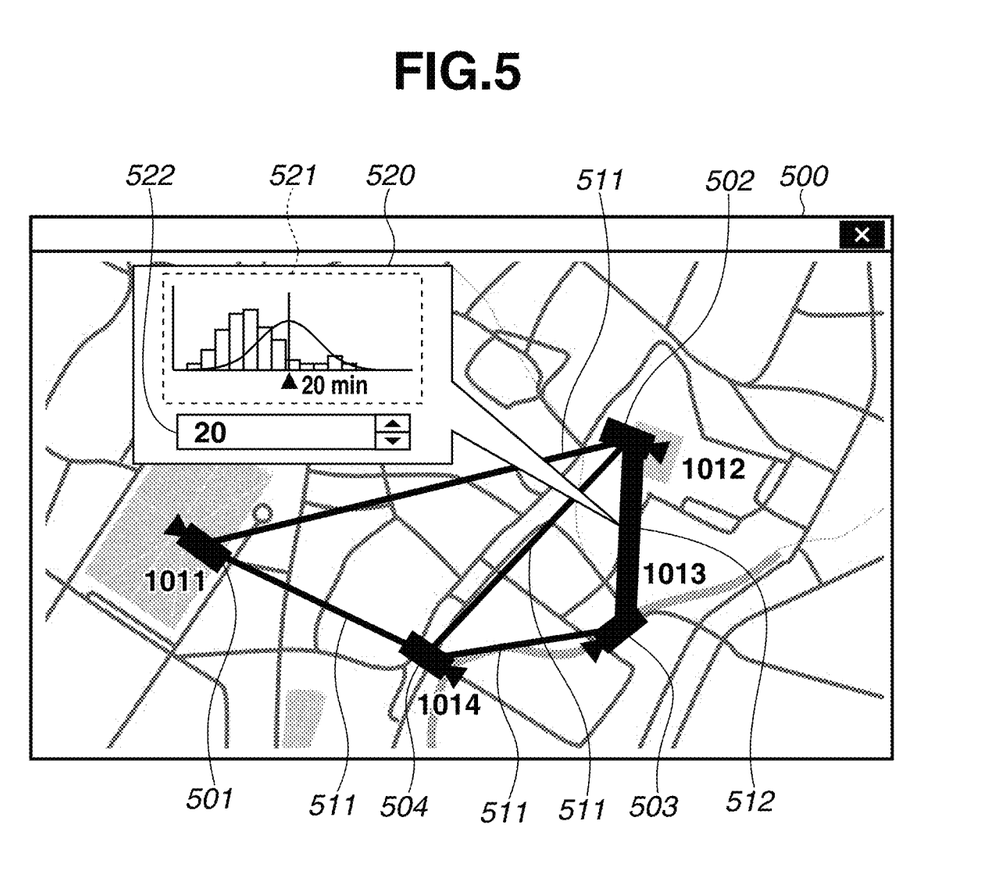
FIG. 5 is a diagram illustrating an example of a display screen.

As illustrated in FIG. 5, a map is displayed on a window 500 on the screen, and marks 501 to 504 which represent the cameras are each superimposed and displayed at a position corresponding to the installation position of the respective cameras 100A to 100D on the map. In addition, individual camera IDs (1101 to 1104) may also be displayed near the marks 501 to 504 representing the cameras.

The image processing apparatus 200 also displays the information indicating the state between the cameras in a visually different mode depending on the state between the cameras. In the present exemplary embodiment, cameras on the map are connected to each other with a line segment, and a style of the line segment for connecting the cameras is set depending on the state between the cameras. For example, a light-blue thin line 511 is used when the state between the cameras is the normal state, and a red thick line 512 is used when the state between the cameras is the modification recommended state.

As illustrated in FIG. 5, a balloon-shaped pictorial FIG. 520 may be superimposed on the line segment 512 which indicates that the state between the cameras is in the modification recommended state. A comparison result 521 of the restriction condition and the identification result may be displayed within the balloon-shaped pictorial FIG. 520. Here, a distribution illustrating the restriction condition on which the identification result is superimposed can be displayed as the comparison result 521. The balloon-shaped pictorial FIG. 520 may also include therein a text box 522 for accepting a user input. The user can instruct that the average value of the distribution of the restriction condition be changed, by inputting a numerical value to the text box 522. An average value of the distribution of the current restriction condition may be previously set to the text box 522 as a default value.

Any information indicating the state between the cameras is displayed on the window 500. Thus, only a line segment corresponding to the modification recommended state may be displayed thereon, for example. In this way, an excess of information can be prevented from displaying on the window 500, so that the user can easily check the cameras for which the restriction condition set between the cameras requires modification. Further, a balloon-shaped pictorial figure may be displayed for all the line segments between the cameras. In such a case, a size of the individual balloon-shaped pictorial figures may be changed depending on the state between the corresponding cameras.

Further, a value to be modified by the user may be any value serving as a parameter value relating to the restriction condition, and a variance may also be included in addition to the average value. In order to input a numerical value, the user can also use a slider bar in addition to the text box.

In the example illustrated in FIG. 5, while the case has been described where the state between the cameras is superimposed and displayed on the map, the display method is not limited to the method using a map.

Referring back to FIG. 3B, in step S13, the image processing apparatus 200 determines whether the user has input a parameter value for the restriction condition via the display screen for the restriction condition. If the user input is received (YES in step S13), the image processing apparatus 200 determines that an instruction to modify the restriction condition is received from the user, and advances the processing to step S14. On the other hand, if the user input is not received (NO in step S13), the processing in FIG. 3B ends.

In step S14, the image processing apparatus 200 applies the value input by the user to the restriction condition recorded in the storage area 208 to modify the restriction condition, and ends the processing in FIG. 3B. For example, if "15" is input as a parameter value for the restriction condition set between the cameras 1012 and 1013 in FIG. 4B, the image processing apparatus 200 modifies the average value of the distribution of the restriction condition between the cameras 1012 and 1013 to 15 minutes from 20 minutes.

Variation Example

In the above-described exemplary embodiment, it is assumed that the restriction condition follows the normal distribution. However, a function that expresses another distribution can be used in substitution for the normal distribution. In such a case, a portion corresponding to a coefficient of the function that expresses a distribution of the restriction condition may be input by the user in step S12 in FIG. 3B. Alternatively, a function itself which fits the identification result may be selected by the user. Furthermore, the restriction condition may be in a form in which a value is input to a time sectioned into a certain period, such as a histogram.

In the above-described present exemplary embodiment, the case has been described where a camera-to-camera travel time of the object is used as the restriction condition. Alternatively, a probability of an object traveling from a camera to another camera (hereinafter, referred to as a travel probability) can also be used as the restriction condition. In such a case, the restriction condition set between cameras can be a numerical value between 0 and 1, inclusive. In other words, setting zero set as the restriction condition indicates that no object traveling from the camera to the other camera exists. Setting one as the restriction condition indicates that the object certainly travels from the camera to the other camera.

Figure 6:
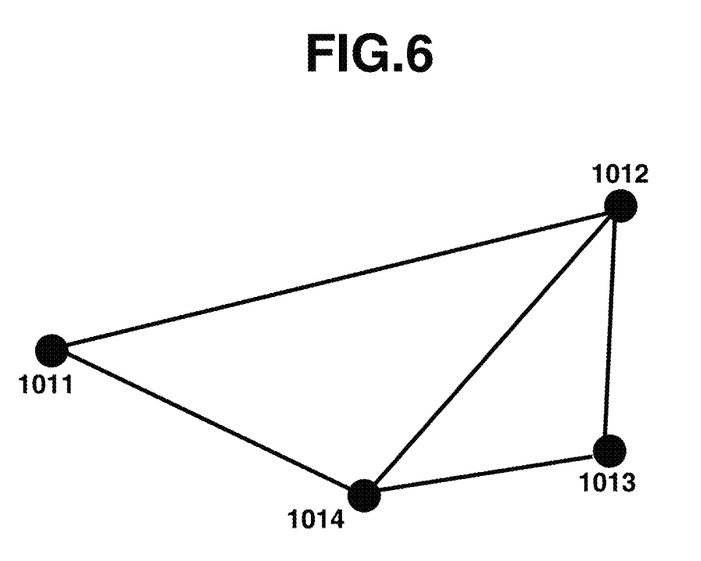
FIG. 6 is a diagram illustrating an example of a connection relationship between cameras.

Alternatively, the restriction condition may include information indicating a connection relationship between cameras as illustrated in FIG. 6. Numerical values 1011 to 1014 in FIG. 6 represent camera IDs. In FIG. 6, a camera having a camera ID 1011 is connected to a camera having a camera ID 1012 and a camera having a camera ID 1014, and is not connected to a camera having a camera ID 1013. Thus, an object traveling between the cameras 1011 and 1013 does not exist in FIG. 6. Here, the information about the connection relationship between the cameras may be optionally determined by the user, or the cameras for which the objects are actually identified may be connected automatically.

In a case where the travel probability is used as the restriction condition, modification of the object-to-object distance in step S4 of FIG. 3A is executed based on the travel probability. For example, if the object-to-object distance and the travel probability are respectively expressed as "l" and "f", a modified object-to-object distance l' can be expressed by the following formula:

$$l'=l+f.$$ Formula 3

In this case, the modified object-to-object distance l' becomes longer as the travel probability f is lower. As a result, the object is less likely to be estimated as the identical object.

In step S5, the image processing apparatus 200 records the actual camera-to-camera travel probability in the storage area 208 as the identification result. For example, such a probability for an actual travel from the camera of the camera ID 1011 to the camera of the camera ID 1012 can be calculated as the number of times of identification of the objects between the cameras 1011 and 1012 to the number of times of identification of the objects between all of the cameras connected to the camera of the camera ID 1011. In other words, the actual camera-to-camera travel probability between the cameras 1011 and 1012 can be set as the number of times of identification between the cameras 1011 and 1012 to the number of times of identification between the cameras 1011 and 1012 and between the cameras 1011 and 1014.

Then, in step S6, the image processing apparatus 200 compares the restriction condition between the cameras (travel probability) with the actual camera-to-camera travel probability. If a difference between the restriction condition and the actual camera-to-camera travel probability is less than a predetermined threshold value, the state between the cameras can be defined as "normal state", and if a difference between the restriction condition and the actual camera-to-camera travel probability is the threshold value or more, the state between the cameras can be defined as "modification recommended state". Thus, the camera-to-camera travel probability can also be used as the restriction condition.

In the above-described exemplary embodiment, two states, while "normal state" and "modification recommended state" are defined as the state between the cameras, three or more states may be defined as the state between the cameras. For example, if the state between the cameras is the modification recommended state for a certain period and the image processing apparatus 200 has the function of automatically regenerating (updating) the restriction condition to fit the identification result, the states between the cameras may include "modification completion state" indicating that update of the restriction condition is completed. In other words, the state between the cameras can include a state where the restriction condition set between the cameras has to be or does not have to be modified, and a state where the restriction condition set between the cameras has been or has not been updated.

In such a case, the image processing apparatus 200 generates the restriction condition to be set between the cameras based on the identification result recorded in the storage area 208. Examples of a method for generating the restriction condition includes a method where the Gaussian fitting is performed on a histogram of the identification result, a normal distribution obtained through this Gaussian fitting process is set to the restriction condition, and an average and a variance in the normal distribution are used. In addition, when the state between the cameras is the modification completion state, the state between the cameras may be displayed on a display screen for the restriction condition in a display mode visually different from the other states. This configuration enables the user to easily recognize that the restriction condition has been updated automatically.

In the above-described exemplary embodiment, the operation of the image processing apparatus 200 has been described with respect to the case where the restriction condition has already been set between cameras. Alternatively, the image processing apparatus 200 can automatically set the restriction condition between cameras in a state where the restriction condition is not set between the cameras, or in a state where a preset initial value is set as the restriction condition between the cameras. In the following description, a state where the restriction condition is not set between cameras and a state where the initial value is set as the restriction condition between cameras are defined as a state where the restriction condition between cameras is in the initial setting.

In such a case, three states, i.e., "preparatory state", "completion state", and "normal state", can be defined as the state between cameras. The preparatory state refers to a state where the restriction condition is in the initial setting, so that the restriction condition has to be set. The completion state refers to a state where the restriction condition is automatically settable while the restriction condition is in the initial setting. The normal state refers to a state where the restriction condition has been set. In other words, the state between the cameras can include a state where the restriction condition set between the cameras has to be or does not have to be set, and a state where the restriction condition set between the cameras is settable or not settable.

Figure 7A:
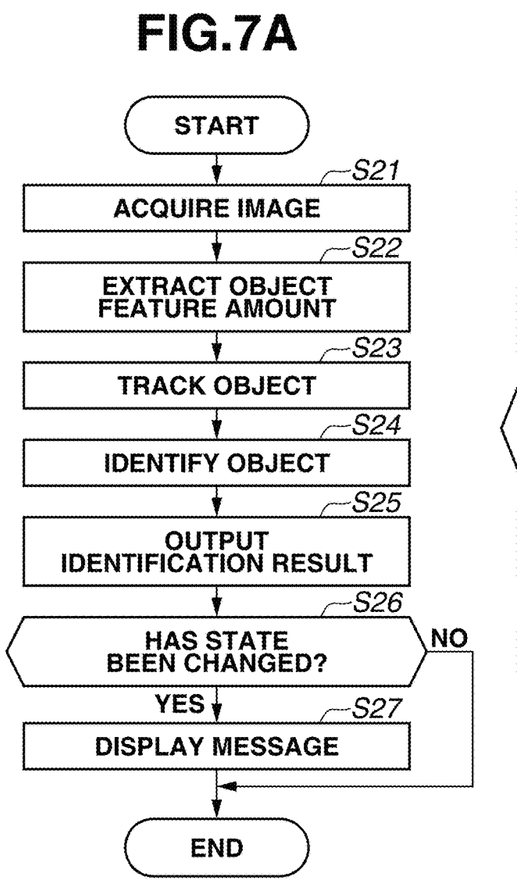
FIGS. 7A and 7B are flowcharts illustrating another processing which is executed by the image processing apparatus.

FIG. 7A is a flowchart illustrating processing for determining a state between cameras which is performed by the image processing apparatus 200. As in the above-described processing in FIG. 3A, the processing in FIG. 7A can be started at a timing when the cameras 100A to 100D start capturing images. However, the timing for starting the processing in FIG. 7A is not limited to this timing. The image processing apparatus 200 can realize the processing illustrated in FIG. 7A by the CPU 211 reading and executing a necessary program.

The operations in steps S21 to S23 are similar to those described in steps S1 to S3 in FIG. 3A. The image processing apparatus 200 extracts a feature amount of the object from a captured image acquired from the camera, and tracks the identical object in a plurality of images captured by the camera.

In step S24, the image processing apparatus 200 executes identification processing for associating identical objects captured by the cameras. In step S24, the identification processing is executed by using a different method depending on the state between the cameras. Specifically, in a case where the state between the cameras is "preparatory state" or "completion state", the image processing apparatus 200 executes the identification processing based on the feature amount of the object. In other words, the image processing apparatus 200 executes the identification processing for identifying the object between the cameras by using the feature amount and the captured time associated with the tracking ID specified by the user, and the feature amount and the captured time of the object recorded in the storage area 208. In such a case, while the object-to-object distance is calculated through a method similar to the above-described method used in the operation in step S4 of FIG. 3A, operation in step S24 is different from that in step S4 in that modification of the object-to-object distance using the restriction condition is not executed.

On the other hand, in a case where the state between the cameras is the "normal state", the image processing apparatus 200 executes the identification processing based on the feature amount of the object and the restriction condition set between the cameras. In other words, the image processing apparatus 200 executes the identification processing for identifying the object between the cameras by using the feature amount and the captured time associated with the tracking ID specified by the user, the feature amount and the captured time of the object recorded in the storage area 208, and the restriction condition set between the cameras. In such a case, as in the processing in step S4 of FIG. 3A, modification of the object-to-object distance using the restriction condition is also executed.

The image processing apparatus 200 then compares the object-to-object distance with a predetermined threshold value, and determines that objects are identical if the object-to-object distance thereof is the threshold value or less. As the tracking information for the object area determined as the identical object, the image processing apparatus 200 stores the camera ID, the feature amount of the object area, the central position of the object area, the size of the rectangular area enclosing the object area, and a captured time in the storage area 208 in association with the same tracking ID.

The operation in step S25 is similar to that in step S5 in FIG. 3A. Specifically, the image processing apparatus 200 records the identification result between the cameras in the storage area 208. In addition, the camera-to-camera travel time of the identified object can be set as the identification result between the cameras.

In step S26, the image processing apparatus 200 determines the state between the cameras from the identification result between the cameras recorded in the storage area 208 and determines whether the state between the cameras has been changed. The image processing apparatus 200 initially counts the number of votes v2 casted for all of the bins in a histogram as the identification result between the cameras, and determines the state between the cameras by comparing the number of entire votes v2 with a preset threshold value.

$$v2 = \Sigma_t b(t) \qquad \text{Formula 4}$$

In Formula 4, "b(t)" is a value of the bin at a time t in the histogram of the identification result. The number of entire votes v2 which is calculated through Formula 4 represents the number of identification results recorded in the storage area 208.

The image processing apparatus 200 determines the state between the cameras as the preparatory state if the number of entire votes v2 is less than the threshold value when the current state between the cameras is the preparatory state. On the other hand, if the number of entire votes v2 is the threshold value or more when the current state between the cameras is the preparatory state, the image processing apparatus 200 determines the state between the cameras as the completion state. When the current state between the cameras is the normal state, the image processing apparatus 200 determines the state between the cameras as the normal state regardless of the identification result.

If the state between the cameras has been changed (YES in step S26), the processing proceeds to step S27. If the state between the cameras has not been changed (NO in step S26), the image processing apparatus 200 ends the processing in FIG. 7A. In other words, if there is a state between the cameras which is changed from the preparatory state to the completion state, the processing proceeds to step S27.

In step S27, the image processing apparatus 200 displays a message prompting the user to make a setting of the restriction condition between the cameras which is in the completion state, and shifts a screen to the setting screen of the restriction condition. For example, a pop-up message "preparation for setting the restriction condition is completed" may be displayed on an upper right portion of the screen. Further, in step S27, a confirmation button for shifting the screen to the setting screen of the restriction condition may be displayed, and the screen may be shifted to the setting screen for the restriction condition when the image processing apparatus 200 detects that the confirmation button is pressed by the user.

Figure 7B:
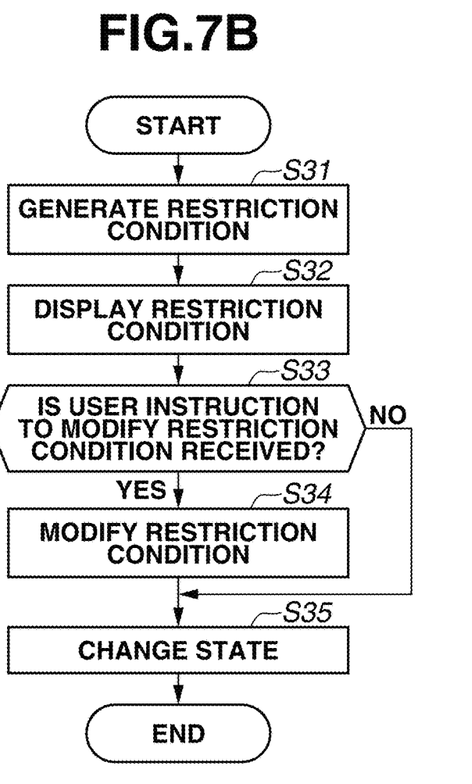

FIG. 7B is a flowchart illustrating processing of setting the restriction condition which is executed by the image processing apparatus 200.

The processing in FIG. 7B can be started at a timing when the user inputs an instruction to activate a setting screen for the restriction condition. The timing for starting the processing in FIG. 7B is however not limited to the above-described timing. The processing in FIG. 7B can be started after the operation in step S27 in FIG. 7A is executed. The image processing apparatus 200 can realize the processing illustrated in FIG. 7B by the CPU 211 reading a necessary program and executing the read program.

In step S31, the image processing apparatus 200 acquires the state between the cameras and the identification result recorded in step S25 from the storage area 208, and generates a restriction condition based on the identification result. Examples of a method for generating the restriction condition includes a method where the Gaussian fitting is performed on a histogram of the identification result, a normal distribution obtained through this Gaussian fitting process is set to the restriction condition, and an average and a variance in the normal distribution are used. The image processing apparatus 200 then records the generated restriction condition in the storage area 208.

In step S32, the image processing apparatus 200 acquires the restriction condition between the cameras from the storage area 208, acquires a map illustrating a real space and information about the installation of the cameras in the real space, and displays the information on the screen. An example of the display screen for the restriction condition is similar to the example illustrated in FIG. 5.

At this time, a style of the line segment for connecting the cameras is specified depending on the state between the cameras. For example, a light-blue dotted line is used when the state between the cameras is the preparatory state, a red thick line is used when the state between the cameras is the completion state, and a green thin line is used when the state between the cameras is the normal state.

As in the example illustrated in FIG. 5, a balloon-shaped pictorial figure is superimposed on the line segment indicating that the state between the cameras is in the completion state, and a distribution representing the restriction condition on which the identification result is superimposed may be displayed inside the balloon-shaped pictorial figure. The balloon-shaped pictorial figure may also include therein a text box for accepting a user input. The user can instruct the image processing apparatus 200 to change the average value of the distribution of the restriction condition by inputting a numerical value to the text box. An average value of the distribution of the current restriction condition may be previously set to the text box as a default value.

The operations in steps S33 and S34 are similar to those in steps S13 and S14 in FIG. 3B. In other words, when the image processing apparatus 200 determines that an instruction to modify the restriction condition is received from the user, the image processing apparatus 200 modifies the restriction condition recorded in the storage area 208 based on the instruction to modify the restriction condition. In step S35, the image processing apparatus 200 changes the state between the cameras which is in the completion state to the normal state, and ends the processing in FIG. 7B.

As described above, the image processing apparatus 200 according to the present exemplary embodiment executes the identification processing for associating identical objects captured by the plurality of cameras with each other, and records a result of the identification processing in the storage area 208. The image processing apparatus 200 then determines a state of the restriction condition (a state between the cameras) based on the result of the identification processing recorded in the storage area 208 and the restriction condition relating to the identification processing that has been set between the cameras. In this way, the image processing apparatus 200 can easily determine the state between the cameras based on the history of the result of the object identification processing between the cameras. Accordingly, in a case where the restriction condition that requires modification exists, the image processing apparatus 200 can easily specify cameras for which the restriction condition set therebetween requires modification, and can automatically modify the restriction condition or prompt the user to modify the restriction condition. In other words, determining the state between the cameras facilitates the modification of restriction condition set between the cameras.

Here, the state between the cameras can include at least any one of a state where the restriction condition has to be or does not have to be modified, a state where the restriction condition has been or has not been updated, a state where the restriction condition has to be or does not have to be set, and a state where the restriction condition is settable or not settable.

Specifically, in a case where a degree of divergence between the identification processing result recorded in the storage area 208 and the restriction condition set between the cameras is a predetermined threshold value or more, the image processing apparatus 200 can determine that the state between the cameras is a state where the restriction condition has to be modified. In other words, the image processing apparatus 200 can determine that the state between the cameras is the modification recommended state described above.

In a case where the restriction condition to be set between the cameras is generated based on the identification processing result recorded in the storage area 208, the image processing apparatus 200 can determine that the state between the cameras is a state where the restriction condition has been updated. Thus, the state between the cameras can be determined as the above-described modification completion state. In a case where the state between the cameras is the modification recommended state, where the restriction condition has to be modified, for a certain period, the image processing apparatus 200 may generate a restriction condition to be set between the cameras based on the identification processing result recorded in the storage area 208.

In a case where the restriction condition set between the cameras is the initial setting, the image processing apparatus 200 can determine that the state between the cameras is in a state where the restriction condition has to be set. More specifically, the image processing apparatus 200 can determine the state between the cameras as the above-described preparatory state in a case where the restriction condition set between the cameras is the initial setting and where the number of identification processing results recorded in the storage area 208 is less than a predetermined threshold value.

In a case where the restriction condition set between the cameras is the initial setting and where the number of identification processing results recorded in the storage area 208 is a predetermined threshold value or more, the image processing apparatus 200 can determine that the state between the cameras is a state where the restriction condition is settable. In other words, the state between the cameras can be determined as the above-described completion state.

The image processing apparatus 200 extracts a feature amount of an object from a captured image captured by each of the plurality of cameras, and sets an object as an identification target from a captured image captured by a predetermined camera in the object identification processing. The image processing apparatus 200 then identifies the object by determining whether an object in a captured image of a camera different from the predetermined camera is identical to the identification target object based on the feature amounts extracted from the respective captured images and the restriction condition set between the cameras. In this way, the object can be appropriately identified between the cameras by executing the processing of identifying the object in consideration of the restriction condition set between the cameras in addition to the feature amount of the object.

Here, the restriction condition set between the cameras can include at least one of the camera-to-camera travel time of the object and the camera-to-camera travel probability for the object. Using a spatiotemporal restriction, such as the travel time of the object and the travel probability for the object, enables the identification processing to be accurately performed.

The identification processing result recorded in the storage area 208 can be represented by a parameter value corresponding to the restriction condition set between the cameras. In other words, the identification processing result recorded in the storage area 208 can include at least any one of the camera-to-camera travel time of the object and the camera-to-camera travel probability for the object. In this way, the identification processing result recorded in the storage area 208 is set as the parameter value corresponding to the restriction condition set between the cameras, so that the identification result and the restriction condition can easily be compared. Thus, whether or not the restriction condition is appropriately set is easily determined.

The image processing apparatus 200 can execute display control for displaying the information indicating the determined state between the cameras on the display unit 216 in a case where the state between the cameras is determined. With this processing, the user can easily check whether the restriction condition is appropriately set between the cameras. The user can also easily recognize which restriction condition set between the cameras should be modified if there is any inappropriate restriction condition.

As described above, the image processing apparatus 200 can prompt the user to determine whether to set or modify the restriction condition by providing the information indicating the state of the restriction condition set between the cameras. Further, because the image processing apparatus 200 enables the user to easily select the restriction condition set between the cameras that requires modification, it is possible to reduce time and effort necessary for modifying the restriction condition.

The image processing apparatus 200 may display a line segment connecting cameras on a map where the cameras are arranged, and may set a style of the line segment connecting the cameras depending on the state between the cameras. In this way, the information indicating the state between the cameras is displayed in a visually different mode depending on the state between the cameras, thus enabling the user to easily recognize the state between the cameras.

Furthermore, the image processing apparatus 200 can display the restriction condition set between the cameras and the history of the identification processing result recorded in the storage area 208 together with the information indicating the state between the cameras. This enables the user to also check the current setting status of the restriction condition and the identification processing result, so that the user can appropriately determine how the restriction condition should be set or modified. If the image processing apparatus 200 displays the restriction condition set between the cameras and the history of the identification processing result recorded in the storage area 208 together with the information indicating the state between the cameras, the user can easily recognize the degree of divergence between the restriction condition and the identification processing result. Accordingly, the user can modify the restriction condition easily and appropriately.

As described above, the image processing apparatus 200 according to the present exemplary embodiment can specify the state of the restriction condition set between image-capturing apparatuses based on the history of the identification processing result of an object in the captured images captured by the image-capturing apparatuses and the restriction condition set between the image-capturing apparatuses. Thus, the restriction condition set between the image-capturing apparatuses can be modified easily, and the processing of identifying the object in captured images captured by the image-capturing apparatus can be accurately executed. Accordingly, the identical object can be accurately tracked in captured images captured by the plurality of image-capturing apparatuses having no image-capturing area in common.

Other Exemplary Embodiments

The present invention can be realized in such a manner that a program for realizing one or more functions according to the above-described exemplary embodiments is supplied to a system or an apparatus via a network or a storage medium, so that one or more processors in the system or the apparatus read and execute the program. Further, the present invention can also be realized with a circuit (e.g., application specific integrated circuit (ASIC)) that realizes one or more functions.

According to the present exemplary embodiments, it is possible to easily modify the restriction condition which is set between the image-capturing apparatuses and relates to the object identification processing between the image-capturing apparatuses.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-004964, filed Jan. 16, 2019, which is hereby incorporated by reference herein in its entirety.

What is claimed is:

1. An image processing apparatus comprising:
an identification unit configured to execute identification processing for associating an object included in a first captured image captured by a first image-capturing apparatus with an object included in a second captured image captured by a second image-capturing apparatus different from the first image-capturing apparatus;
a recording unit configured to record a result of the identification processing executed by the identification unit;
a determination unit configured to determine a state of a restriction condition based on the result of the identification processing recorded by the recording unit and the restriction condition relating to the identification processing set between the first image-capturing apparatus and the second image-capturing apparatus;
a setting unit configured to set an object to be an identification target from the first captured image;
an extraction unit configured to extract a feature amount of an object from each of the first captured image and the second captured image; and
a determining unit configured to determine an object identical to the object to be an identification target set by the setting unit from the second captured image based on the feature amounts extracted by the extraction unit and the restriction condition set between the first and second image-capturing apparatuses.

2. The image processing apparatus according to claim 1, wherein, as a state of the restriction condition, the determination unit determines at least any one of a state where the restriction condition set between the first and second image-capturing apparatuses has to be or does not have to be modified, a state where the restriction condition set between the first and second image-capturing apparatuses has been or has not been updated, a state where the restriction condition set between the first and second image-capturing apparatuses has to be or does not have to be set, and a state where the restriction condition set between the first and second image-capturing apparatuses is settable or not settable.

3. The image processing apparatus according to claim 2, wherein, in a case where a degree of divergence between the result of the identification processing recorded by the recording unit and the restriction condition set between the first and second image-capturing apparatuses is a predetermined threshold value or more, the determination unit determines the state of the restriction condition as the state where the restriction condition has to be modified.

4. The image processing apparatus according to claim 2, further comprising a generation unit configured to generate a restriction condition to be set between the first and second image-capturing apparatuses based on the result of the identification processing recorded by the recording unit,
wherein the determination unit determines the state of the restriction condition as the state where the restriction condition has been updated in a case where the restriction condition is generated by the generation unit.

5. The image processing apparatus according to claim 4, wherein the generation unit generates the restriction condition in a case where the state of the restriction condition is the state where the restriction condition has to be modified, for a certain period.

6. The image processing apparatus according to claim 2, wherein the determination unit determines the state of the restriction condition as the state where the restriction condition has to be set in a case where the restriction condition set between the first and second image-capturing apparatuses is an initial setting.

7. The image processing apparatus according to claim 2, wherein there are a plurality of the results of the identification processing, and
wherein the determination unit determines the state of the restriction condition as the state where the restriction condition is settable in a case where the restriction condition set between the first and second image-capturing apparatuses is an initial setting and where the number of the results of the identification processing recorded by the recording unit is a predetermined threshold value or more.

8. The image processing apparatus according to claim 1, wherein the restriction condition includes at least any one of a travel time of an object from the first image-capturing apparatus to the second image-capturing apparatus or from the second image-capturing apparatus to the first image-capturing apparatus and a probability of an object traveling from the first image-capturing apparatus to the second image-capturing apparatus or from the second image-capturing apparatus to the first image-capturing apparatus.

9. The image processing apparatus according to claim 1, wherein the result of the identification processing includes at least any one of a travel time of an object from the first image-capturing apparatus to the second image-capturing apparatus or from the second image-capturing apparatus to the first image-capturing apparatus and a probability of an object traveling from the first image-capturing apparatus to the second image-capturing apparatus or from the second image-capturing apparatus to the first image-capturing apparatus.

10. The image processing apparatus according to claim 1, further comprising a display control unit configured to display information indicating a state of the restriction condition determined by the determination unit.

11. The image processing apparatus according to claim 10, wherein the display control unit displays the information in a visually-different mode depending on the state of the restriction condition determined by the determination unit.

12. The image processing apparatus according to claim 10, wherein the display control unit displays a restriction condition set between the first and second image-capturing apparatuses together with the information.

13. The image processing apparatus according to claim 10, wherein the display control unit displays the result of the identification processing recorded by the recording unit together with the information.

14. An image processing method comprising:
executing identification processing for associating an object included in a first captured image captured by a first image-capturing apparatus with an object included in a second captured image captured by a second image-capturing apparatus different from the first image-capturing apparatus;
recording a result of the identification processing;
determining a state of a restriction condition based on the recorded result of the identification processing and the restriction condition relating to the identification processing set between the first image-capturing apparatus and the second image-capturing apparatus;

setting an object to be an identification target from the first captured image;

extracting a feature amount of an object from each of the first captured image and the second captured image; and determining an object identical to the object to be an identification target set by the setting unit from the second captured image based on the feature amounts extracted by the extraction unit and the restriction condition set between the first and second image-capturing apparatuses.

15. The image processing method according to claim 14, wherein, as a state of the restriction condition, at least any one of a state where the restriction condition set between the first and second image-capturing apparatuses has to be or does not have to be modified, a state where the restriction condition set between the first and second image-capturing apparatuses has been or has not been updated, a state where the restriction condition set between the first and second image-capturing apparatuses has to be or does not have to be set, and a state where the restriction condition set between the first and second image-capturing apparatuses is settable or not settable is determined in the determining.

16. The image processing method according to claim 15, wherein, in a case where a degree of divergence between the result of the identification processing recorded in the recording and the restriction condition set between the first and second image-capturing apparatuses is a predetermined threshold value or more, the state where the restriction condition has to be modified is determined as the state of the restriction condition, in the determining.

17. The image processing method according to claim 15, further comprising generating a restriction condition to be set between the first and second image-capturing apparatuses based on the result of the identification processing recorded in the recording, wherein the state where the restriction condition has been updated is determined as the state of the restriction condition in the determining in a case where the restriction condition is generated in the generating.

18. The image processing method according to claim 17, wherein the restriction condition is generated in the generating in a case where the state of the restriction condition is the state where the restriction condition has to be modified, for a certain period.

19. A non-transitory computer-readable medium storing a program for causing a computer to execute an image processing method comprising:

executing identification processing for associating an object included in a first captured image captured by a first image-capturing apparatus with an object included in a second captured image captured by a second image-capturing apparatus different from the first image-capturing apparatus;

recording a result of the identification processing;

determining a state of a restriction condition based on the recorded result of the identification processing and the restriction condition relating to the identification processing set between the first image-capturing apparatus and the second image-capturing apparatus;

setting an object to be an identification target from the first captured image;

extracting a feature amount of an object from each of the first captured image and the second captured image; and determining an object identical to the object to be an identification target set by the setting unit from the second captured image based on the feature amounts extracted by the extraction unit and the restriction condition set between the first and second image-capturing apparatuses.

* * * * *